(12) United States Patent
Lyngby et al.

(10) Patent No.: US 8,643,997 B2
(45) Date of Patent: Feb. 4, 2014

(54) LIGHTNING CURRENT TRANSFER ASSEMBLY FOR A WIND TURBINE

(75) Inventors: Claus Grøn Lyngby, Brædstrup (DK); Hans V. Erichsen, Aarhus V (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 13/515,910

(22) PCT Filed: Dec. 9, 2010

(86) PCT No.: PCT/EP2010/007507
§ 371 (c)(1),
(2), (4) Date: Jan. 7, 2013

(87) PCT Pub. No.: WO2011/072821
PCT Pub. Date: Jun. 23, 2011

(65) Prior Publication Data
US 2013/0100570 A1    Apr. 25, 2013

Related U.S. Application Data

(60) Provisional application No. 61/286,413, filed on Dec. 15, 2009.

(30) Foreign Application Priority Data

Dec. 15, 2009    (EP) ..................... 09179235

(51) Int. Cl.
*H02H 9/06*    (2006.01)
(52) U.S. Cl.
USPC ........................................................ 361/117
(58) Field of Classification Search
USPC ........................................................ 361/117
See application file for complete search history.

(56) References Cited

U.S. PATENT DOCUMENTS

| 6,407,900 | B1 * | 6/2002 | Shirakawa et al. | ........... 361/117 |
| 2013/0100570 | A1 * | 4/2013 | Lyngby et al. | ............... 361/117 |

FOREIGN PATENT DOCUMENTS

| DE | 102008020262 A1 | 10/2009 |
| EP | 1036937 A2 | 9/2000 |
| EP | 1568883 A2 | 8/2005 |
| EP | 1577551 A2 | 9/2005 |
| WO | 0186144 A1 | 11/2001 |

OTHER PUBLICATIONS

European Search Report and Written Opinion from counterpart European Application No. 09179235.8 mailed Jun. 30, 2010 (5 pages).
International Search Report and Written Opinion from counterpart PCT Application No. PCT/EP2010.007507 mailed Oct. 19, 2011 (10 pages).

* cited by examiner

*Primary Examiner* — Ronald W Leja
(74) *Attorney, Agent, or Firm* — Patterson & Sheridan, LLP

(57) ABSTRACT

A lightning current transfer assembly (2) for a wind turbine (1) is arranged to transfer lightning current from a wind-turbine part (8) to another part (8) rotatable relative to it. The assembly comprises at least one electric contact arrangement (11', 11") comprising complementary contact members (12a', 12b', 12a", 12b") which provide electric connection by mechanically contacting each other while being movable relative to each; a spark gap (4) connected in series with the movement-enabling contact arrangement (11', 11"); and a spark-gap-bridging resistance (6) connected parallel to the spark gap (4). Thereby, the assembly provides at least two alternative current paths: (i) a lightning current path across the at least one electric contact arrangement and the spark gap, and (ii) a permanent-discharge current path across the at least one electric contact arrangement and through the spark-gap-bridging resistance.

16 Claims, 9 Drawing Sheets

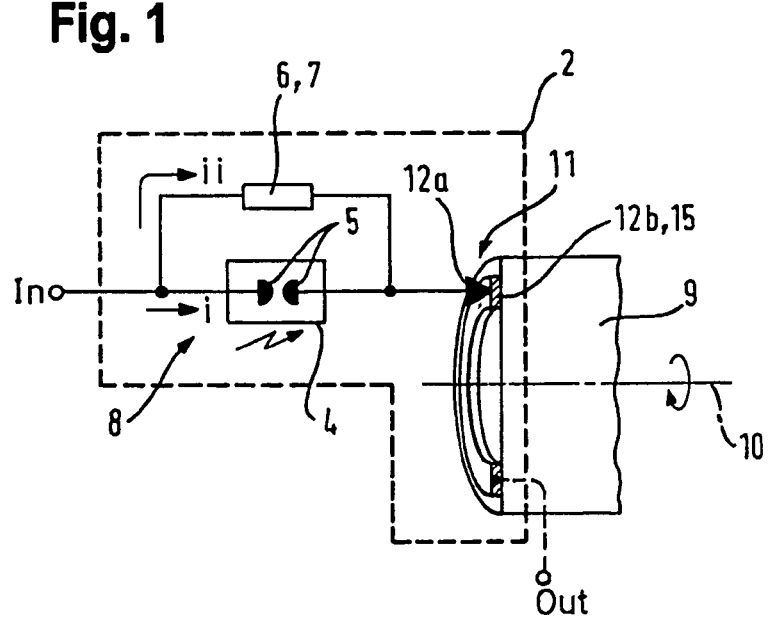
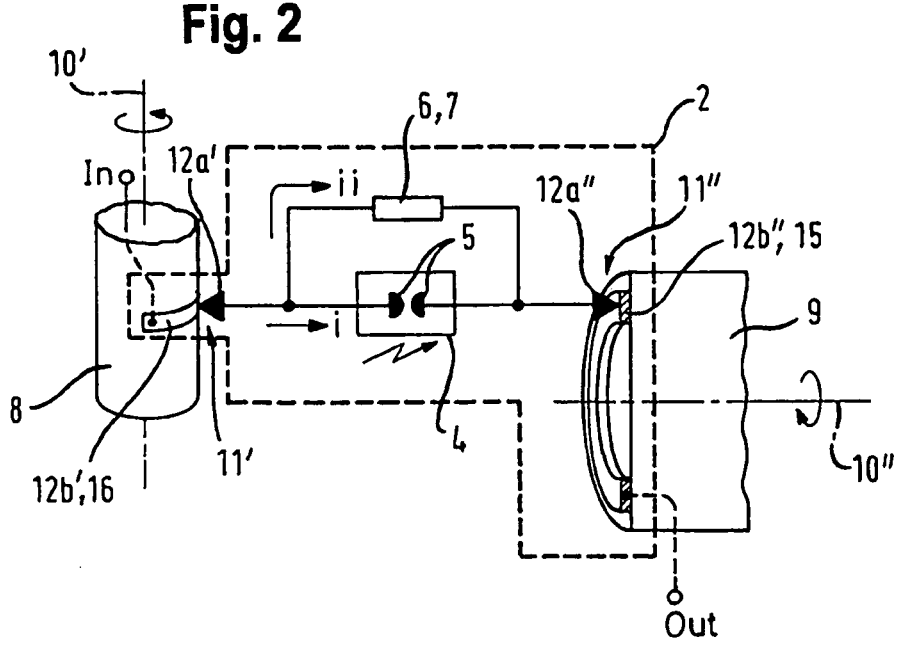

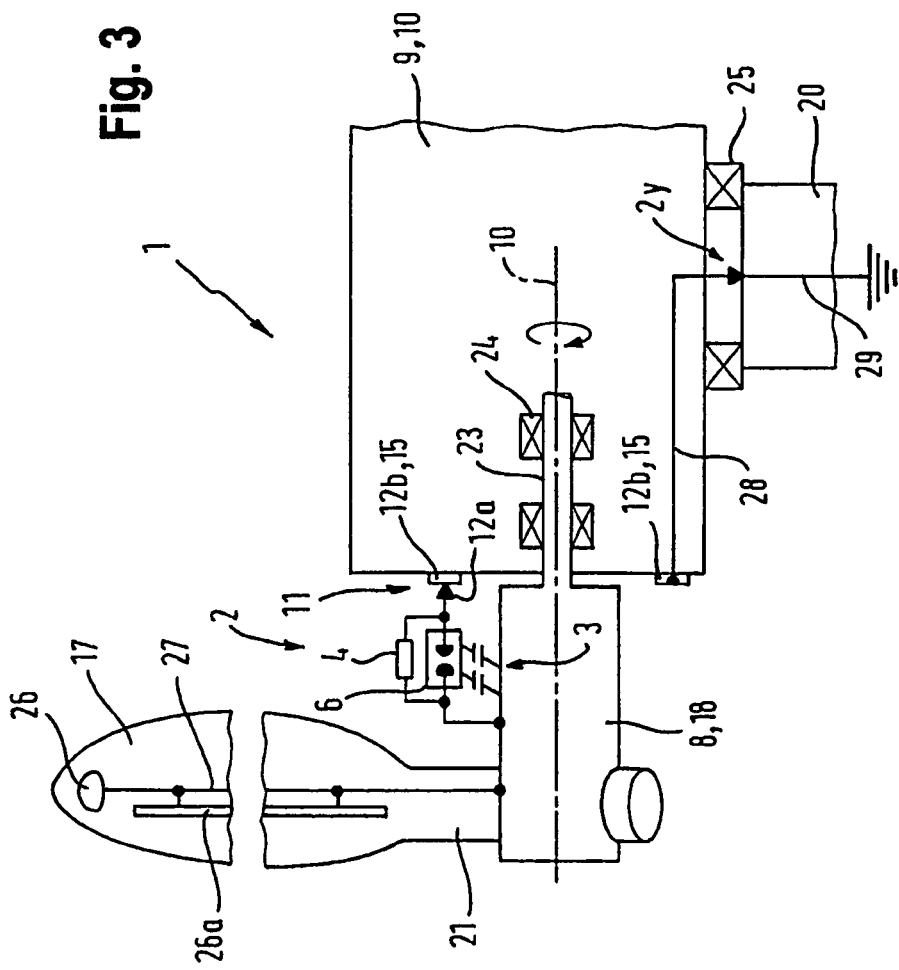

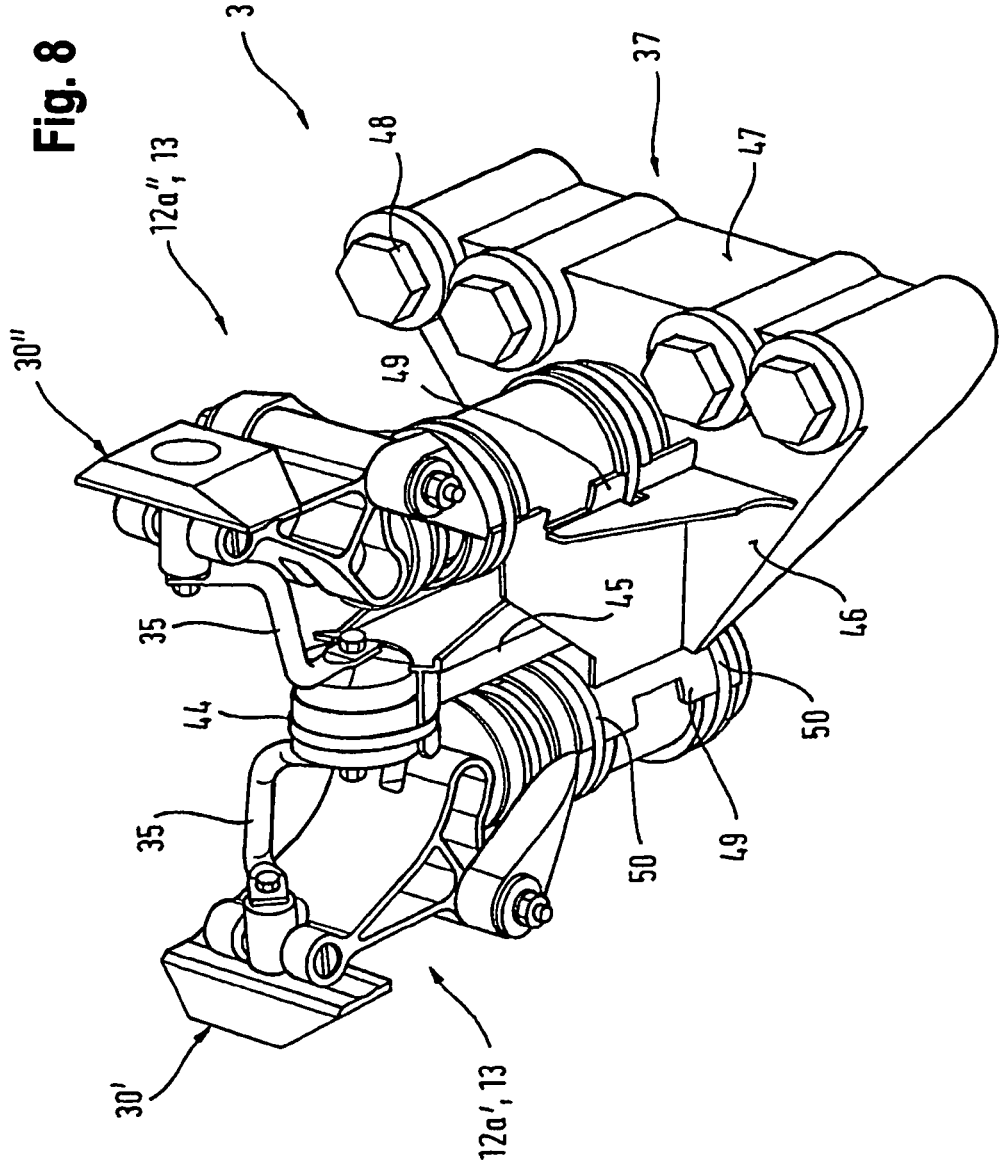

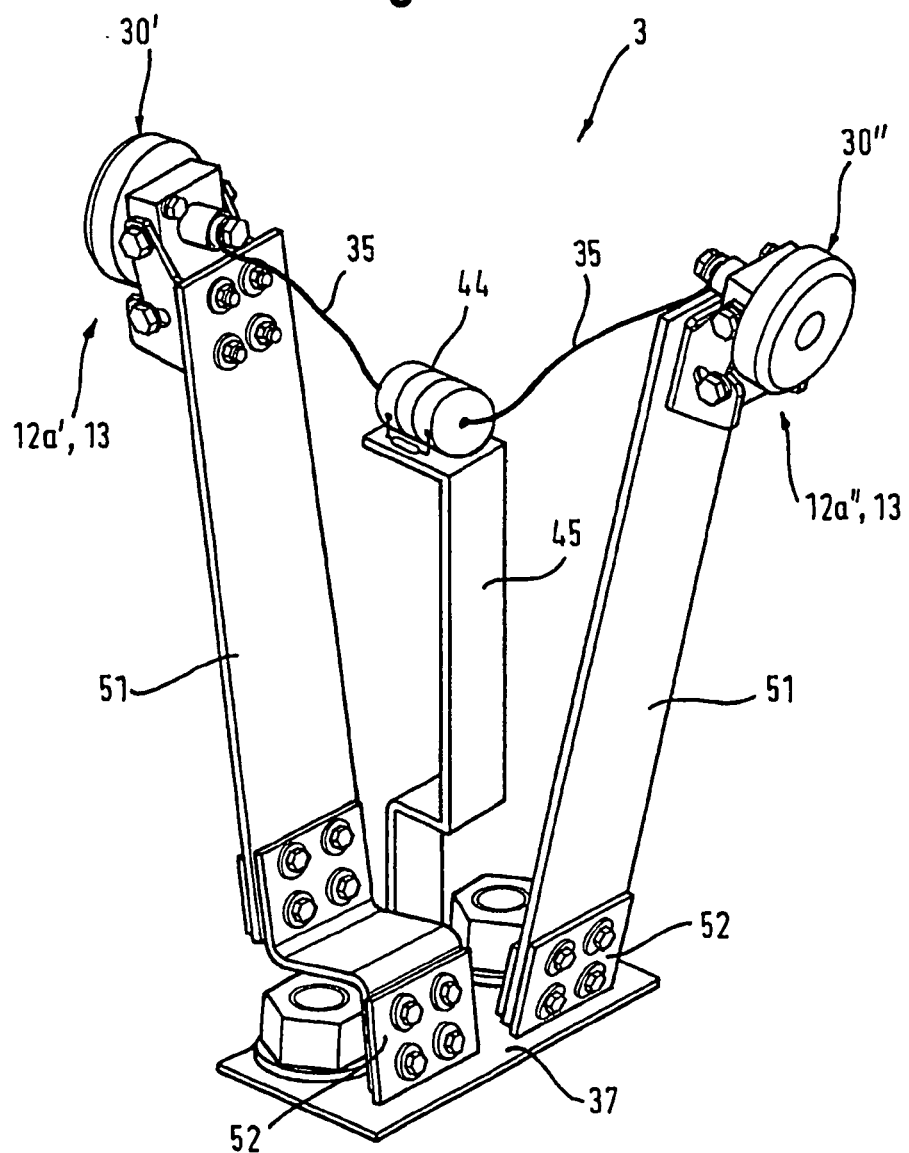

LIGHTNING CURRENT TRANSFER ASSEMBLY FOR A WIND TURBINE

FIELD OF THE INVENTION

The present invention relates to lightning current conduction in wind turbines and, for example, to a lightning current transfer assembly for a wind turbine, and a wind turbine comprising one or more lightning current transfer assemblies.

BACKGROUND OF THE INVENTION

A lightning current transfer assembly for a wind turbine is known, for example, from WO 2005/050008. It enables lightning current to be transferred from a rotor blade of the wind turbine to the wind turbine's nacelle by means of two electric contact arrangements. The electric contact arrangements provide galvanic connection while being movable relative to each other. They are made up of sliding contacts and a complementary belt and ring at the rotor blade and the nacelle, respectively (see e.g. FIGS. 3a and 3b of WO 2005/050008).

It has also been proposed that such a galvanic and movement-enabling electric contact arrangement can be protected from being damaged by high lightning current by means of a spark gap connected parallel to the electric contact arrangement. The electrodes forming the spark gap are movable relative to each other, as are the contact elements of the parallel electric contact arrangement. For example, one of the electrodes is a circular ring, and the other is a tip moving over the ring at a small distance. When the rotor blade is struck by lightning, the high lightning voltage will create a discharge over the spark gap, so that the lightning current does not flow through the parallel electric contact arrangement. Examples of wind turbines with such electric contact arrangements protected by parallel spark gaps are known from WO 2004/044419 A1 (sliding-contact arrangement with parallel spark gap between rotor blade and rotor hub) and EP 1 577 551 A2 (sliding-contact arrangement with parallel spark gap between rotor hub and nacelle).

Similarly, EP 1 568 883 A2 proposes that a brush contacting a contact roller of a lightning current transfer assembly for a wind turbine be protected by means of a spark gap parallel to the brush contact.

U.S. Pat. No. 6,932,574 B2 pertains to a lightning current transfer assembly for a wind turbine which also enables lightning current to be transferred from a rotor blade of the wind turbine to the wind turbine's nacelle. However, it is a different type of lightning current transfer assembly, as the gaps between the rotor blade/rotor hub and between rotor hub/nacelle are not bridged by galvanic contacts with contact members which provide galvanic connection while being movable relative to each other, but rather by spark gaps. When the rotor blade is struck by lightning, the high lightning voltage will create a discharge over the spark gap. In order to prevent charges due to static charging from accumulating in the rotor blade, a second current path is provided which provides a continuous galvanic connection path from the rotor blade to the earth, via the rotor hub. In order to prevent lightning current from taking the second current path (until the discharge across the spark gap fires), a series connection of a resistor and an inductor is interposed in the second current path.

SUMMARY OF THE INVENTION

A lightning current transfer assembly is provided for a wind turbine, the wind turbine comprising at least a first part and a second part rotatable relative to each other. The lightning current transfer assembly is arranged to transfer lightning current from the first part to the second part. The lightning current transfer assembly comprises: at least one electric contact arrangement comprising complementary contact members which provide electric connection by mechanically contacting each other while being movable relative to each other; a spark gap connected in series with the at least one electric contact arrangement, wherein the spark gap comprises spark-gap electrodes, the spark-gap electrodes being stationary relative to each other; and a spark-gap-bridging resistance connected parallel to the spark gap. Thereby, the lightning current transfer assembly provides at least two alternative current paths from the first part to the second part: (i) a lightning current path across the at least one electric contact arrangement and the spark gap, and (ii) a permanent-discharge current path across the at least one electric contact arrangement and through the spark-gap-bridging resistance.

According to another aspect, a wind turbine is provided comprising at least one lightning current transfer assembly.

Other features are inherent in the methods and products disclosed or will become apparent to those skilled in the art from the following description and the accompanying drawings.

BRIEF DESCRIPTION OF THE DRAWINGS

Embodiments of the present invention are explained by way of example with reference to the accompanying drawings, in which:

FIG. 1 is a circuit diagram of an embodiment of a lightning current transfer assembly transferring lightning current between two parts rotatable relative to each other around one axis;

FIG. 2 is a circuit diagram of an embodiment similar to that of FIG. 1, however, with the two parts rotatable relative to each other around two different axes;

FIG. 3 schematically illustrates a wind turbine equipped with an embodiment of a lightning current transfer assembly which transfers current between a rotor blade and a rotor hub of the wind turbine;

FIG. 8 is a perspective view of an embodiment of a lightning current transfer unit of the type illustrated in FIGS. 2 and 5 with pivotable contact members;

FIG. 9 is a similar view of another embodiment of a lightning current transfer unit with the contact members being mounted on elastically deformable strips;

Figure 4:
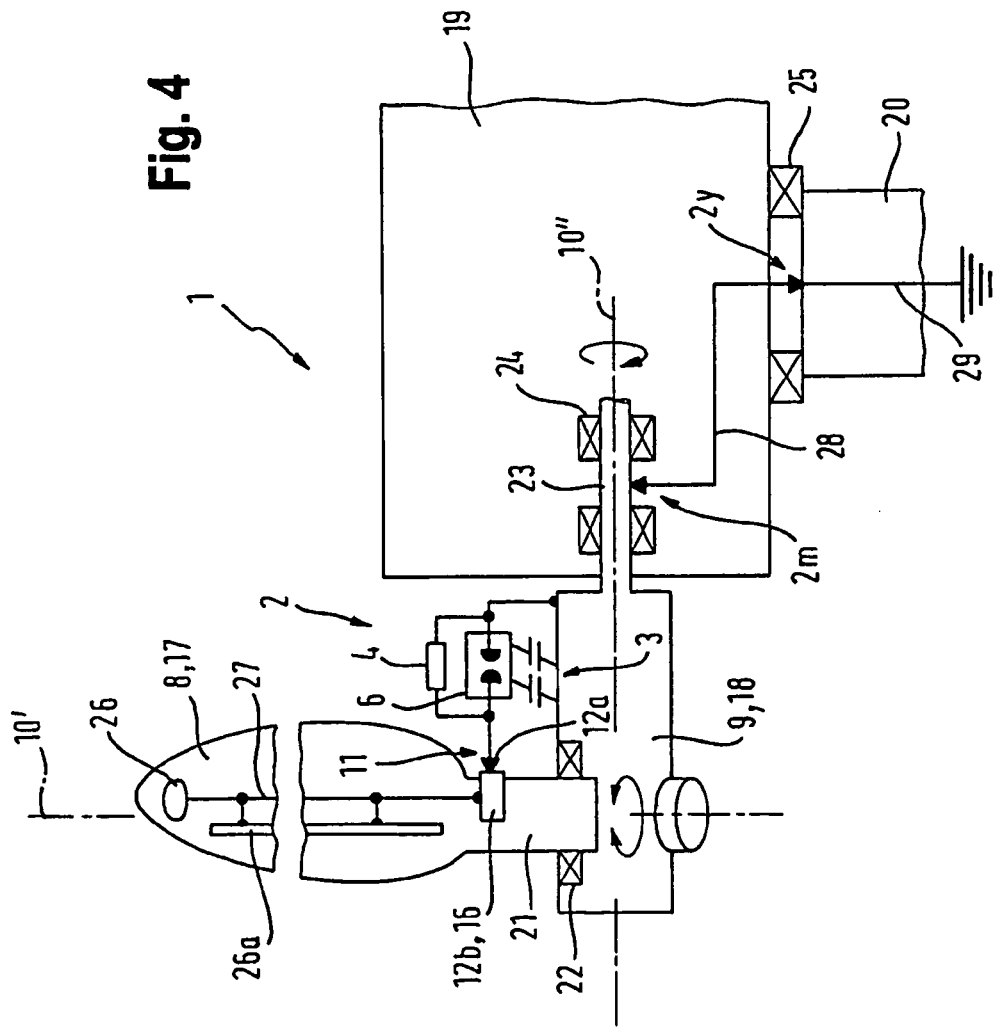
FIG. 4 is similar to FIG. 3, but illustrates a wind turbine equipped with another embodiment of a lightning current transfer assembly which transfers current between a rotor hub and a nacelle of the wind turbine.

The drawings and the description of the drawings are of embodiments of the invention and not of the invention itself.

GENERAL DESCRIPTION OF EMBODIMENTS

Before turning to the detailed description of the embodiments shown in the drawings, a few more general items will first be discussed.

Wind turbines can be unwanted sources of electromagnetic radiation. The wind turbine's rotor can more or less continuously emit electromagnetic energy in a relatively broad frequency range, including the radio frequency range. This may cause radio frequency interference. It has been observed that unwanted emission of electromagnetic energy can be particularly significant if the wind turbine is located near to a strong radio transmitter.

Wind turbines are commonly equipped with a lightning conductor system, and it has been recognised by the present inventors that lightning current transfer assemblies forming part of the lightning conductor system are often the cause of the unwanted electromagnetic-energy emission. The main function of such a lightning current transfer assembly is to transfer lightning current from a first part of the wind turbine to a second part of the wind turbine rotatable relative to it.

For example, the first part may be one of the wind turbine's rotor blades, and the second and part may be the wind turbine's nacelle. A rotor blade is usually equipped with a lightning receptor near the blade tip, and a lightning conductor from the lightning receptor to the blade root. In this example, the lightning current transfer assembly connects the lightning conductor at the blade root to a continuation of the lightning conductor starting at the nacelle and leading down to the ground along the wind turbine's tower; the yaw bearing (i.e. the bearing between the tower and the nacelle) is, for example, bridged by a flexible cable, or another lightning current transfer assembly.

It has been recognised that in lightning current transfer assemblies which provide a galvanically-connected current path by means of an electric contact arrangement with contact members mechanically contacting each other, e.g. in the form of sliding or rolling contacts, the galvanic connection may be repeatedly interrupted for very short time intervals. This is due to the contact slider or roller lifting off its complementary contact surface, thereby momentarily interrupting the current path. Current does not only flow through the lightning current transfer assembly when the rotor blade is struck by lightning, but there is normally also a (much smaller) permanent-discharge current, caused by electrostatic charging of the rotor blade due to the rotor blade's movement relative to the air. Owing to the inductance of the total lightning current path, any such sudden interruption of the current flow will cause a relatively high voltage to be induced. In conventional lightning current transfer assemblies of the galvanic-connection type (e.g. WO 2005/05008, WO 2004/044419 A1, EP 1 577 551 A2, EP 1 568 883 A2) this will cause sparking flashovers to occur at the sliding or rolling contacts. These sparking flashovers involve sudden rises of the discharge current, which cause the emission of the broadband electromagnetic energy by the wind turbine rotor, with the rotor blades then acting as a sort of transmission antenna for the broadband electromagnetic energy.

It has also been recognised that the permanent-discharge current which may cause the sparking flashovers at the contact arrangement of conventional lightning current transfer assemblies is not always only produced by electrostatic charging of the rotor blades. Wind turbines located near a strong radio transmitter may act as radio antennas receiving a considerable amount of radio power from the radio transmitter. The received radio power may cause additional currents to flow from the rotor through the lightning current transfer assemblies to ground. This may increase the frequency and intensity of the sparking flashovers at the sliding or rolling contacts. Thus, the picking-up of the radio signal may result in an additional amount of electromagnetic power being emitted by the rotor. Thus, a conventional wind turbine near a strong radio emitter can function as a sort of transponder which receives electromagnetic energy in a narrow radio frequency band, and re-transmits a significant fraction of it in a broad radio frequency band.

The lightning current transfer assembly of the present embodiments also has at least one electric contact arrangement comprising complementary contact members which provide electric connection by mechanically contacting each other while being movable relative to each other, e.g. slider or roller contacts. The solution to the problem of electromagnetic-energy transmission (or re-transmission) provided by the embodiments is to interpose a resistance in the permanent-discharge current path. The resistance reduces the magnitudes of the sudden current rises that would otherwise be associated with the short interruptions of the galvanic connection at the complementary contact members.

However, discharging static charges (and picked-up radio signals) is only a side function: the main function of the embodiments of the lightning current transfer assembly is to conduct lightning current to earth. If only the current path were made high-ohmic by interposing the resistance, the resistance would immediately be destroyed by lightning current, when the wind turbine is struck by lightning. Therefore, in the embodiments, a spark gap is provided parallel to the resistance. Seen from the spark gap's perspective, the resistance bridges the spark gap, and is therefore also named "spark-gap-bridging resistance" The spark gap and the parallel spark-gap-bridging resistance are connected in series with the electric contact arrangement comprising the complementary contact members which provide electric connection by mechanically contacting each other while being movable relative to each other.

A spark gap can be regarded as a highly nonlinear component: When the voltage across the spark-gap electrodes is small, so that no spark is fired, the spark gap presents a galvanic interruption; its resistance is virtually infinite (i.e. much bigger than that of the spark-gap-bridging resistance). However, when the voltage across the spark-gap electrodes becomes high, a spark is fired and current can flow through the spark's plasma; the spark gap's resistance is then virtually zero (i.e. much smaller than that of the spark-gap-bridging resistance).

In this way, the lightning current transfer assembly provides two alternative current paths: (i) a "lightning current path" across the contact arrangement and the spark gap; and (ii) a "permanent-discharge current path" across the electric contact arrangement and through the spark-gap-bridging resistance.

In some embodiments, the spark-gap-bridging resistance has linear characteristics, that is to say its value is independent of the voltage across the resistance so that the relation between the voltage across the spark-gap-bridging resistance and the current through it is linear.

When the rotor blade is struck by lightning the voltage across the spark gap (and the parallel spark-gap-bridging resistance) will rise suddenly, which will immediately fire the spark gap. Once the spark gap has fired, since its resistance is then very small (in the order of a few $\Omega$) and the value of the spark-gap-bridging resistance is bigger, nearly all of the lightning current will flow across the spark gap. This prevents the spark-gap-bridging resistance from being damaged or destroyed by lightning current. Accordingly, the current path across the contact arrangement and the spark gap is called the "lightning current path". During normal operation, in the absence of lightning, the voltage across the spark gap will be too small to fire (or maintain) a discharge across the spark gap. Therefore, the lightning-current path will be interrupted, and all the current from static charging (and RF reception, if applicable) will flow across the electric contact arrangement and through the spark-gap-bridging resistance. The spark-gap-bridging resistance reduces the magnitudes of the sudden current rises that would otherwise be associated with short interruptions of the galvanic connection at the complementary contact members. As the latter current path enables permanent discharging of the wind turbine part upstream of the lightning current transfer assembly (e.g. a rotor blade), apart from the short interruptions of the galvanic connection at the complementary contact members, it is called the "permanent-discharge current path".

The interplay between the lightning-discharge and the permanent-discharge operation modes is governed by the ratio between the spark-gap-bridging resistance and the voltage at which the spark gap fires (spark-gap-firing voltage).

Absolute values of the spark-gap-firing voltages, in some of the embodiments, are in the range from one kV up to several tens of kV, for example in the range from 1 to 50 kV.

In some embodiments, the spark gap is an air gap between two (e.g. rounded) electrodes, for example with a smallest electrode distance in the range from $\frac{1}{10}$ mm to 20 mm. In other embodiments, the spark gap is made of two electrodes with a temperature-resistant insulator (such as mica) between the electrodes. In the latter type of spark gaps the arc usually burns at the periphery of the electrodes, outside the gap between the electrodes with the interposed insulator. This prevents the electrodes from being welded together by the spark.

In order to reduce electrode wear, in some embodiments, the spark-gap electrodes (with air gap or insulator-filled gap) are made of, or coated with, a burn-off resistant material, such as tungsten, or an alloy comprising such a material, e.g. a tungsten-copper alloy.

Absolute values of the spark-gap-bridging resistance, in some of the embodiments, are in the range of several kΩ to several GΩ, for example 10 kΩ to 1 GΩ. Generally, a sufficiently large spark-gap-bridging resistance is chosen to limit sparking flashovers at the galvanic contact arrangement, so as to prevent significant radio interference from being produced. On the other hand, the spark-gap-bridging resistance chosen should be sufficiently small to keep the voltage produced by the current due to static charging (and RF reception, if appropriate) across the spark-gap-bridging resistance and the parallel spark gap so low that the spark gap is normally not fired, in the absence of lightning.

In the embodiments, the (non-contacting) spark-gap electrodes are stationary, i.e. fixed relative to each other during operation of the wind turbine. This does not necessarily mean that the distance between the spark-gap electrodes is absolutely fixed; it could, for example, be adjustable during maintenance or repair. However, it means that it is not the spark gap's function to bridge the gaps between wind turbine parts rotatable relative to each other (such as the gaps between a rotor blade and the rotor hub, or the gap between the rotor hub and the nacelle), as the spark gaps in U.S. Pat. No. 6,932,574 B1 mentioned at the outset.

Using non-stationary spark gaps to bridge gaps between relatively rotatable parts in the prior art may have the advantage that there is no wear, due to the absence of mechanical contact between the bridged parts, but bridging relatively rotatable parts only by a spark gap does not enable the charges from static charging to be permanently discharged. It is for this reason that U.S. Pat. No. 6,932,574 B1 has to provide another parallel current path from the rotor blades through the rotor hub to ground, which does not involve mechanically contacting contact members to transfer current from the rotor blades. Non-stationary spark gaps are also used to bridge the gaps between relatively rotating parts in parallel with electric contact arrangements also bridging the gap (cf. WO 2004/044419 A1, EP 1 577 551 A2, EP 568 883 A2). The motive of providing those spark gaps is to protect such a parallel electric contact arrangement from being damaged by lightning current. The embodiments disclosed herein, however, have a stationary spark gap with a spark-gap-bridging resistance to reduce the emission of electromagnetic energy caused by an electric contact arrangement—this does not exclude, of course, that an additional spark gap may be provided in parallel to the electric contact arrangement to prevent it from being damaged, if appropriate.

The spark-gap-bridging resistance can, in principle, be a "parasitic" resistance of some other element of the lightning current transfer assembly, e.g. of a weakly conductive housing or encapsulation of the spark gap. However, in some of the embodiments the spark-gap bridging resistance comprises one or more resistors, i.e. dedicated components whose only function, or at least whose main function, is to provide electric resistance. For example, connecting wires, sliding or rolling contacts, etc. may have some (normally small) resistance, but are not "resistors".

In some embodiments, the complementary contact members of the at least one electric contact arrangement comprise a contact slider and a complementary ring mechanically contacted by the contact slider upon relative rotation of the ring and the contact slider. If the relative rotation does not extend to full revolutions (such as the rotation between the rotor hub and the nacelle), but is limited to an only partial revolution (less than 360°, such as the rotation between a pitchable rotor blade and the rotor hub), the complementary ring may be replaced by a complementary belt. The belt is usually also ring-shaped, but only extends over a limited angular range, at least corresponding to the angular range of the relative rotation concerned. In some embodiments the contact slider is a rigid member elastically biased towards the ring or belt, while in other embodiments it may be a device having some elasticity to mechanically contact the ring or belt on its own, e.g. a sort of electrically conductive brush. In some embodiments, a contact roller is provided instead of a contact slider.

In the some of the embodiments the lightning current transfer assembly comprises a sub assembly that is a lightning current transfer unit which includes the spark gap, the spark-gap-bridging resistance, and one of the contact members of the electric contact arrangement. The other contact member, complementary to the latter, is not part of the lightning current transfer unit. In embodiments in which the lightning current transfer assembly has two or more electric contact arrangements, that is two or more pairs of complementary contact members, the lightning current transfer unit includes the spark gap, the spark-gap-bridging resistance, and one of the contact members of each pair of contact members. The other contact member of each pair is not part of the lightning current transfer unit. For example, in some embodiments a lightning current transfer unit mounted on, and rotating with, the rotor hub includes a spark gap, a spark-gap-bridging resistance, one contact member in the form of e.g. a contact slider or roller towards a rotor blade and another contact member in the form of e.g. a contact slider or roller towards the nacelle. The complementary contact members (which are e.g. a belt mounted on the rotor blade near the blade root and a ring mounted at the front part of the nacelle) do not belong to the lightning current transfer unit. The arrangement of contact sliders/rollers and rings/belts may be inverse. For example, in other embodiments, a contact slider or roller is mounted on the nacelle (and does not belong to the lightning current transfer unit), while the complementary ring is mounted on the rotor hub and rotates with it relative to the nacelle (and belongs to the lightning current transfer unit).

In some embodiments the lightning current transfer assembly is arranged to transfer lightning current between parts rotatable relative to each other around a single axis, for example between a rotor blade and the rotor hub, or between the rotor hub and the nacelle, or between the nacelle and the tower of the wind turbine.

In other embodiments, however, the lightning current transfer assembly is arranged to transfer lightning current between parts rotatable relative to each other around two different axes. For example, a pitchable rotor blade and the nacelle exhibit relative rotation around two different axes. In some of such embodiments with two different axes the lightning current transfer assembly comprises at least two electric contact arrangements (each with mechanically contacting contact members) connected in series.

In some of the embodiments with two electric contact arrangements connected in series, the spark gap is electrically interposed between the at least two electric contact arrangements. The spark-gap-bridging resistance is connected parallel to the spark gap. Thereby, a series connection of the first electric contact arrangement, the parallel connection of the spark gap and the spark-gap-bridging resistance, and the second electric contact arrangement is formed. The spark-gap-bridging resistance is connected parallel to the spark gap, but is not parallel to the first or second electric contact arrangements. The bifurcation and junction points which form the parallel connection of the spark gap and the spark-gap-bridging resistance are located between the first and second electric contact arrangements. This means that there is only a single current path at the level of the first and second electric contact arrangements.

As already mentioned above, in some embodiments, the lightning current transfer assembly comprises a sub-assembly; this is a lightning current transfer unit. The lightning current transfer unit includes only the halves of the pairs of contact members that form the contact arrangements. In some of the embodiments with relatively rotatable parts around two different axes, and at least two electric contact arrangements connected in series, the lightning current transfer unit is arranged to be mounted on the rotor hub and to rotate with it. In those embodiments, the lightning current transfer assembly provides a lightning current path and a permanent-discharge current path from the rotor blade to the nacelle by means of the at least two electric contact arrangements, connected in series with the parallel connection of the spark gap and the spark-gap-bridging resistance interposed.

The rotor shaft (and the load-carrying parts of the hub and the nacelle) of a wind turbine are usually made of electrically conductive material, and the bearing rings and rolling elements of big bearings (such as the blade pitch bearings and the main shaft bearing) are usually also electrically conductive. Consequently, if the lightning current path is not electrically isolated from the rotor hub, a fraction or all of the lightning current could pass through the blade pitch bearing and/or the main shaft bearing. As the durability of bearings might be reduced by exposure to lightning current crossing the bearings, in some embodiments with a lightning current transfer unit mounted on the rotor hub, the current paths provided by the lightning current transfer unit (i.e. the lightning current path and the permanent-discharge current path) are electrically isolated from the rotor hub. Thereby, lightning current bypasses the rotor hub and the rotation-enabling bearings between the rotor blade and the rotor hub and between the rotor hub and the nacelle (e.g. the blade pitch and main shaft bearings).

Moreover, in some embodiments, the complementary contact ring or belt at the blade root, which is normally electrically connected to a lightning receptor at the blade tip, is also electrically isolated from the blade pitch bearing. This can be realised, for example, by the blade being made only of insulating material at the blade root, such as glass fibre reinforced plastics. This ensures that lightning current can hardly reach the hub via the blade pitch bearing. Lightning current will then rather flow directly from the rotor blade to the nacelle, bypassing the blade pitch and main shaft bearings.

As the distance between the two (e.g. elastically biased) contact members of the lightning current transfer unit is not necessarily constant, the contact members are connected by a flexible wire in some embodiments. The spark gap with the spark-gap-bridging resistance is in some embodiments interposed in the flexible-wire connection between the two contact members.

In some embodiments, in order to ensure that currents only take the lightning current path or the permanent-discharge current path, the spark gap with the spark-gap-bridging resistance is mounted on an isolating stand.

In order to isolate also the contact members of the lightning current transfer unit from its support, e.g. from the rotor hub, the lightning current transfer unit comprises a base support made of insulating material. The base support is a common support of both the spark gap (with the spark-gap-bridging resistance) and the contact member or members.

In some embodiments the contact member is mounted on the base support by means of an elastically deformable member, e.g. in the form of a flat strip, which biases the contact member, or one of the contact members, of the lightning current transfer unit to its complementary contact member.

In other embodiments the contact member is pivotally mounted on the base support element, either directly or indirectly, with interposition of a member fixed to the base support. The contact member is pivotal about a swivel axis. In some embodiments, the pivotally mounted contact member is biased towards its complementary contact member by means of a spring, wherein the direction of the spring force is diverted by means of the swivel axis.

As sparks may produce considerable heat, particles may be sputtered from the spark-gap electrodes when a spark is burning. This might contaminate the neighbourhood of the spark gap. As the heat produced by the spark also causes the surrounding air to expand, simply encasing the spark gap hermetically would cause very high pressures to be produced in the spark gap-casing. Therefore, in some embodiments, the spark gap is encapsulated, the encapsulation preventing particles produced when a spark occurs from escaping, but, on the other hand, allowing air to escape. In some embodiments, the spark gap encapsulation comprises a mesh surrounding the spark gap. The mesh aperture is chosen sufficiently small so as to prevent particles (above a typical particle size) from passing outwardly. Heated air can nevertheless escape through the mesh openings.

In other embodiments, the spark gap encapsulation comprises a labyrinth-shaped housing. Heated air can easily escape through the labyrinth, while particles are mostly trapped in the labyrinth.

In some embodiments, the spark gap encapsulation has an electric side function: it is at least partially made of electrically conductive material and forms part of the permanent-discharge current path bridging the spark gap and including the spark-gap-bridging resistance. Thereby, a separate wire around the spark gap encapsulation is saved.

The embodiments disclosed herein not only pertain to lightning current transfer assemblies and units as such, but also to wind turbines equipped with such lightning current transfer assemblies and units. For example, a wind turbine with n (e.g. three) rotor blades may have one lightning current transfer assembly for each rotor blade. That is, n (e.g. three) lightning current transfer units are mounted on the rotor hub, each contacting a complementary contact member (e.g. a ring or belt) at the root of the rotor blade to which it is associated. At the side towards the nacelle, in some embodiments, there is only one contact member (e.g. one ring) on the nacelle which is shared by the n (e.g. three) lightning current transfer units. The same applies to wind turbines with another number of rotor blades; e.g. a wind turbine with n=2.

DETAILED DESCRIPTION OF EMBODIMENTS SHOWN IN THE DRAWINGS

FIGS. 1 and 2 (Circuit Diagrams):

FIGS. 1 and 2 are circuit diagrams of embodiments of lightning current transfer assemblies 2. In the embodiment of FIG. 1 the parts 8, 9 electrically bridged by the lightning current transfer assembly 2 are rotatable relative to each other around one axis, while in the embodiment of FIG. 2 they are rotatable around two different axes.

Both embodiments have a spark gap 4 with two spark-gap electrodes 5 spaced and isolated from each other, and thereby forming a galvanic interruption when no spark is fired. A resistance 6, which is e.g. the resistance of a resistor 7, is connected parallel to the spark gap 4 and thereby bridges the spark gap 4.

The lightning current assembly 2 provides a current bridge between two parts 8, 9 rotatable relative to each other. In the embodiment of FIG. 1 the two parts 8, 9 are rotatable relative to each other around a single axis 10. In the embodiment of FIG. 2, however, the two parts 8, 9 are rotatable relative to each other around two different axes 10', 10". For example, as illustrated in FIG. 2, the two different axes 10', 10" are perpendicular to each other.

In the embodiment of FIG. 1, the first part 8 is, for example, the lightning current transfer assembly 2 itself (except for one of the contact members, which is rotatively fixed to the second part 9, as will be explained below), while the second part 9 is another part of a wind turbine rotatable relative to it. The axes and arrows in FIGS. 1 and 2 symbolise relative rotation; i.e. they do not, as in FIG. 1 for example, indicate that the first part 8 is necessarily stationary while the second part 9 rotates. Rather, the first part 8 can be the rotating part, while the second part 9 can be stationary.

There is no relative rotation between the spark-gap electrodes 5; i.e. the spark-gap electrodes 5 are stationary relative to each other.

The embodiment of FIG. 1 has one electric contact arrangement 11, while the embodiment of FIG. 2 has two electric contact arrangements, denoted by 11' and 11". The electric contact arrangements 11, 11', 11" provide a galvanic connection between the relatively rotatable parts 8, 9. To this end, each contact arrangement 11, 11', 11" has a pair of complementary contact members which provide electric connection by mechanically contacting each other while being moveable relative to each other. In FIG. 1, the contact members of the single contact arrangement 11 are denoted by 12a, 12b, while in FIG. 2 the contact members of the two contact arrangements 11', 11" are denoted by 12a', 12b' and 12a", 12b".

The contact members of each pair, 12a and *b*, 12a' and *b'*, 12a" and *b"* are complementary to each other. For example, the first contact member 12a, 12a', 12a" of each pair is a contact slider and/or roller, and the second contact member 12b, 12b', 12b" of each pair is a complementary contact rail concentric to the axis 10, 10', 10" of the relative rotation, with a radius relative to the axis 10, 10', 10" which corresponds to the first contact member's 12a, 12a', 12a" radial distance from the axis 10, 10', 10". If the angular range of the relative rotation is unlimited, the contact rail is a closed ring 15, as in FIG. 1 and one of the electric contact arrangements, that is 11", of FIG. 2. If, however, the range of the relative rotation is limited to less than 360°, the contact path forming the complementary second contact member need not be a closed ring to cover the range of rotation, but may be a ring sector, as shown at 12b" in FIG. 2. In this description, the ring sector is called "belt", and is referred to in the figures by the number 16.

The lightning current transfer assemblies 2 thereby provide two alternative current paths, i and ii, from an input 'In' at the first part 8 to an output 'Out' at the second-part 9 (wherein In and Out can be interchanged). In the embodiment of FIG. 1, the first current path i, called "lightning current path", starts at the input In and leads across the spark gap 4 and the contact members 12a, 12b moveable relative to each other of the electric contact arrangement 11 to the output Out. The second current path ii, called "permanent-discharge current path", also starts at the input In, but leads through the spark-gap-bridging resistance 6 and the contact members 12a, 12b moveable relative to each other of the electric contact arrangement 11 to the output Out. Thus, the lightning current path i is a series connection of the spark gap 4 and the electric contact arrangement 11, while the permanent-discharge current path ii is a series connection of the spark-gap-bridging resistance 6 and the electric contact arrangement 11. The electric contact arrangement 11 is shared by both current paths i and ii.

In the embodiment of FIG. 2 the alternative current paths i, ii are analogous to those of FIG. 1, but pass through two electric contact arrangements 11', 11", the spark gap 4 and the spark-gap-bridging resistance 6 being interposed between the two electric contact arrangements 11', 11"; the lightning current path i starts at the input In at the first part 8, and leads through the contact members 12a', 12b' moveable relative to each other of the first electric contact arrangement 11', the spark gap 4, the contact members 12a", 12b" moveable relative to each other of the second electric contact arrangement 11" to the output Out at the second part 9. Similarly, the permanent-discharge current path ii also starts at the input In, and leads through the contact members 12a, 12b' moveable relative to each other of the first electric contact arrangement 11, the spark-gap-bridging resistance 6, the contact members 12a", 12b" moveable relative to each other of the second electric contact arrangement 11" to the output Out. Thus, the lightning current path i is a series connection of the first electric contact arrangement 11', the spark gap 4 and the second electric contact arrangement 11", while the permanent-discharge current path ii is a series connection of the first electric contact arrangement 11', the resistance 6, and the second electric contact arrangement 11". Both the electric contact arrangements 11', 11" are shared by the current paths i and ii.

Figure 5:
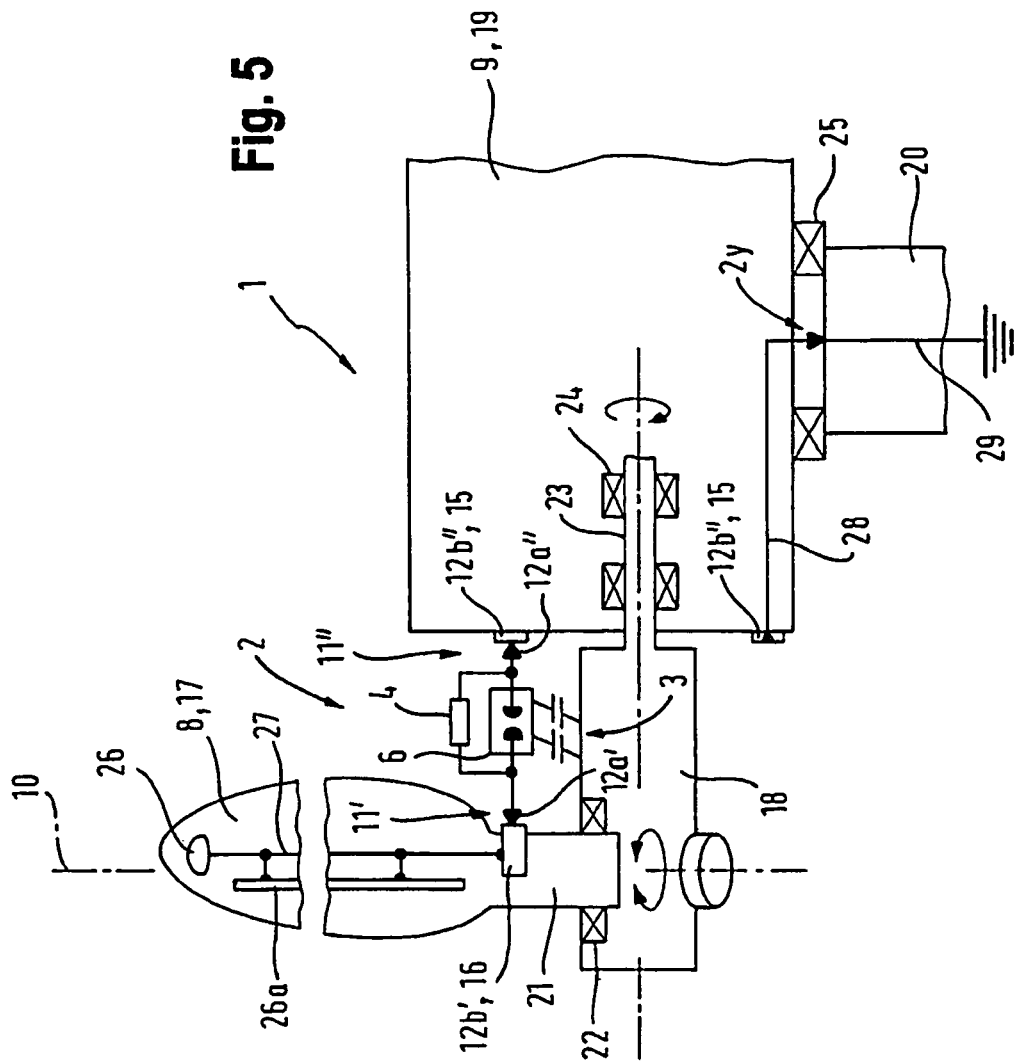
FIG. 5 is similar to FIGS. 3 and 4, but illustrates a wind turbine equipped with another embodiment of a lightning current transfer assembly which transfers current between a rotor blade and a nacelle of the wind turbine.

FIGS. 3 to 5 (Wind Turbines Equipped with Lightning Current Transfer Assemblies):

FIGS. 3 to 5 illustrate wind turbines 1 equipped with different embodiments of lightning current transfer assemblies 2. In FIGS. 3 and 4 the lightning current transfer assemblies 2 are of the single-axis type shown in FIG. 1, while the embodiment of FIG. 5 has a lightning current transfer assembly 2 of the dual-axes type shown in FIG. 2.

The wind turbines 1 of FIGS. 3 to 5 have a plurality of (normally three) rotor blades 17, one of which, and a stump of another one, are shown in FIGS. 3 to 5.

The rotor blades 17 are supported by a rotor hub 18 (the rotor hub 18 is shown extended in its longitudinal direction, in order to provide sufficient space in the drawings to show the lightning current transfer assemblies 2). The rotor hub 18 is supported by a nacelle 19, which rests on a tower 20.

In the embodiments of FIGS. 4 and 5, the blade 17 is pivotally mounted with its root 21 in a blade pitch bearing 22 on the rotor hub 18. In the examples shown, the pitch angle range is smaller than 360°, e.g. about 180°, or in a preferred embodiment, 100°. In the embodiment of FIG. 3 a wind turbine with fixed (not pitchable) blades 17 is illustrated, because the blade pitch bearing is absent. This is only exemplary, in other embodiments with the lightning current transfer assembly 2 of the type shown in FIG. 3 the blade 17 may also be pitchable, as in FIGS. 4 and 5.

The rotor hub 18 is extended by a main shaft 23 which is pivotably mounted on main shaft bearings 24 on the nacelle 19. This is also only exemplary, as in other embodiments the rotatable main shaft 23 is replaced by a fixed shaft extended from the nacelle towards the hub, and the hub is then pivoted on the fixed shaft. A yaw bearing 25 enables the nacelle 19 to be rotated relative to the tower 20.

In all the three embodiments of FIGS. 3 to 5 a sub-assembly of the lightning current transfer assembly 2 is mounted on the rotor hub 18, and rotates with the rotor hub 18. This sub-assembly is called "lightning current transfer unit" and is denoted here by the number 3. The lightning transfer current unit 3 is the lightning current transfer assembly 2 without the contact member or members 12b, 12b', 12b" of the contact arrangement, or arrangements, 11, 11', 11" which is, or are, rotatable relative to the rotor hub 18.

The lightning current transfer unit 3 is mounted in such a manner that it is electrically isolated from the rotor hub 18, which is symbolized in FIGS. 3 to 5 by broken inclined lines between the lightning current transfer units 3 and the rotor hub 18.

In the embodiments of FIGS. 3 to 5, the rotor blade 17 is equipped with a lightning receptor 26 near its tip. The lightning receptor 26 is connected with a lightning conductor 27 along the rotor blade 17. The lightning current path continues through the lightning current transfer unit 3, and further through a lightning conductor 28 in the nacelle 19, another lightning current transfer assembly 2y bridging the yaw bearing 25, and through a lightning conductor 29 in the tower 20 which is grounded near the root of the tower 20. The lightning conductor 27 is also connected to a charge receptor 26a extending along the length of the rotor blade 17 but not to the root 21. The charge receptor 26a may be any electrically conductive or semi-conductive member in the load-carrying structure of the rotor blade 17 (such as a longitudinal beam including semi-conductive carbon fibres) and/or on the blade's surface (such as a metal skin at the blade's leading edge). The charge receptor 26a is able to collect the charges originating from static charging (or reception of radio waves, if applicable). These charges are led to the lightning conductor 27 and flow to the earth along the lightning current path.

As described in connection with the FIGS. 1 and 2, in all the embodiments of FIGS. 3 to 5 the lightning current transfer assemblies 2 provide at least two alternative current paths from the first part 8 to the second part 9, i.e. a lightning current path across the contact arrangement(s) 11, 11', 11" and the spark gap 4, and a permanent-discharge current path across the electric contact arrangement(s) 11, 11', 11" and through the spark-gap-bridging resistance.

Although only one lightning current transfer unit 3 is shown in FIGS. 4 and 5, there will be a plurality of such lightning current transfer units 3, one of each rotor blade 17. In embodiments according to FIG. 5 the plural lightning current transfer units 3 may share a common contact member 12b" e.g. a common ring 15 at the nacelle 19.

In the embodiment of FIG. 3, the first part 8 of the two parts 8, 9 rotatable relative to each other is the rotor hub 18, and the second part 9 is the nacelle 19. Consequently, the axis 10 around which the two parts 8, 9 are rotatable relative to each other is the rotation axis of the rotor hub 18.

The lightning current transfer assembly 2 transfers current between these two parts 8, 9 rotatable relative to each other, i.e. from the rotor hub 18 to the nacelle 19. The input of the lightning current transfer assembly 2 is, for example, electrically connected to the rotor hub 18. The lightning conductor 27 in the rotor blade 17 is also electrically connected to the rotor hub 17, so that current from the rotor blade 17 can flow through the rotor hub 18 into the lightning current transfer assembly 2.

In other embodiments similar to that of FIG. 3, however, the lightning conductor 27 coming down from the lightning receptor 26 is directly connected to the input of the lightning current transfer assembly 2. Such a connection e.g. by means of a continuous cable from the lightning receptor 26 to the input of the lightning current transfer assembly 2 is also possible in embodiments with pitchable rotor blades, since the angular pitch range is usually limited, so that the continuous cable will not be overly twisted. Then, if the root 21 of the rotor blade 17 is made of electrically insulating material, practically all the current from the rotor blade 17 will flow through the lightning current transfer assembly 2, so that the rotor pitch bearing (if applicable), the rotor hub 18, and the main shaft bearing 24 are bypassed.

In the embodiment of FIG. 3, the further current path goes through the spark gap 4 (current path i) or, alternatively, the spark-gap-bridging resistance 6 (current path ii) and across the electric contact arrangement 11, here in the form of an electric contact member 12a rotating with the hub 18 and a stationary complementary contact member 12b, e.g. a contact rail in the form of a ring 15 mounted on the front of the nacelle 19. The ring 15, which forms the output of the lightning current transfer assembly 2, is connected to the lightning conductor 28 in the nacelle 19.

In the embodiment of FIG. 4, the first part 8 of the parts 8, 9 rotatable relative to each other is the rotor blade 17, and the second part 9 is the rotor hub 18. Consequently, the axis 10 around which the two parts 8, 9 are rotatable relative to each other is the rotation axis of the rotor blade 17.

The lightning current transfer assembly 2 transfers current between these two parts 8, 9 rotatable relative to each other, i.e. from the rotor blade 17 to the rotor hub 18. The complementary contact member 12b, here a belt 16 around the root 21 of the rotor blade 17, which is connected to the lightning conductor 27 in the rotor blade 17, forms the input of the lightning current transfer assembly 2. The belt 16 is contacted by the first contact member 12a, e.g. in the form of a contact slider or roller, which forms part of the lightning current transfer unit 3 and rotates with the rotor hub 18. Thus, current will flow from the rotor blade 17 to the lightning current transfer unit 3 across the rotative gap between the two through the electric contact arrangement 11. If the root 21 of the rotor blade 17 is made of electrically insulating material, practically all the current from the rotor blade 17 will thus bypass the blade pitch bearing 22.

In the embodiment of FIG. 4, the further current path goes through the spark gap 4 (current path i) or, alternatively, through the spark-gap-bridging resistance 6 (current path ii) to the output of the lightning current transfer assembly 2, which is, for example, electrically connected to the rotor hub 18. The further current path may go, for example, through the main shaft 23 connected to the lightning conductor 28 in the nacelle 19 by another lightning current transfer assembly 2m.

In the embodiment of FIG. 5, the first part of the parts 8, 9 rotatable relative to each other is the rotor blade 17, and the second part 9 is the nacelle 19. Consequently, the two parts 8, 9 are rotatable relative to each other around two different axes, the rotation axis 10' of the rotor blade 17 and the rotation axis 10" of the rotor hub 18. While the rotation axis 10" of the rotor hub is stationary, the rotation axis 10' of the rotor blade 17 permanently changes its direction upon rotation of the rotor hub 18, as the rotor blade 17 is mounted on the rotor hub 18—it is only stationary in the rotating coordinate system of the rotor hub 18.

The lightning current transfer assembly 2 transfers current between these two parts 8, 9 rotatable relative to each other, i.e. from the rotor blade 17 to the nacelle 19. As in FIG. 4, the complementary contact member 12b', here a belt 16 around the root 21 of the rotor blade 17, which is connected to the lightning conductor 27 in the rotor blade 17, forms the input of the lightning current transfer assembly 2. The belt 16 is contacted by the first contact member 12a', e.g. in the form of a contact slider or roller, which forms part of the lightning current transfer unit 3. Thus, current will flow from the rotor blade 17 to the lightning current transfer unit 3 across the rotative gap between the two through the electric contact arrangement 11'. The further current path goes through the spark gap 4 (current path i) or, alternatively, through the spark-gap-bridging resistance 6 (current path ii). Finally, the current flows across the second electric contact arrangement 11", as in FIG. 3 in the form of an electric contact member 12a" rotating with the hub 18 and a stationary complementary contact member 12b", e.g. a contact rail in the form of a ring 15 mounted on the front of the nacelle 19. The ring 15, which forms the output of the lightning current transfer assembly 2, is connected to the lightning conductor 28 in the nacelle 19.

If the root 21 of the rotor blade 17 is made of electrically insulating material, practically all the current from the rotor blade 17 will flow through the lightning current transfer assembly 2, so that the rotor pitch bearing 22, the rotor hub 18 and the main shaft bearing 24 are bypassed.

Figure 6:
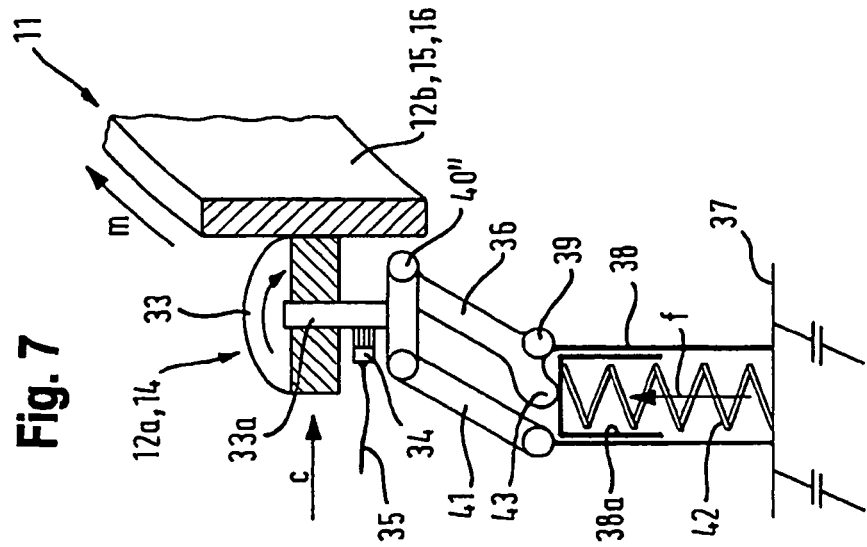
FIG. 6 schematically illustrates an embodiment of contact member in the form of a contact slider.
Figure 7:
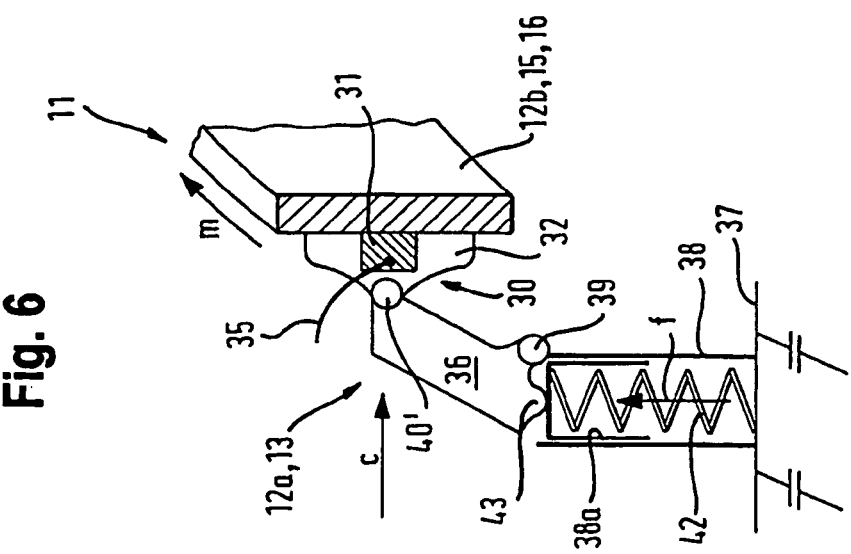
FIG. 7 is similar to FIG. 6, but illustrates another embodiment of a contact member in the form of a contact roller.

FIGS. 6 and 7 (Contact Slider and Roller Embodiments):

FIGS. 6 and 7 show different embodiments of electric contact arrangements 11, 11', 11" (commonly denoted by 11) with different types of first contact members 12a, 12a', 12a" (commonly denoted by 12a): a contact slider 13 (FIG. 6) and a contact roller 14 (FIG. 7).

In both embodiments, the contact member 12a is biased with a contact force towards the complementary contact member 12b, 12b', 12b" (commonly denoted by 12b), e.g. the ring 15 or belt 16, of which only a cut-out is shown in FIGS. 6 and 7. The two contact members 12a, 12b are moveable relative to each other. The movement of the contact member 12a relative to its complementary contact member 12b is symbolised by an arrow m in FIGS. 6 and 7. As only a cut-out is shown in FIGS. 6 and 7, the relative motion appears to be linear, but is actually rotative, as described in connection with FIGS. 1 to 5. The contact force, symbolised by an arrow c, is in a direction perpendicular to the plane of relative rotation, i.e. perpendicular to the ring 15 or belt 16.

In FIG. 6, the contact slider 13 has a slide piece 30 which mechanically contacts the surface of the ring 15 or belt 16 and is made of an electrically conductive contact rod 31 (e.g. of a copper alloy) in the centre and a wear pad 32 (e.g. made of a plastic material) at the circumference of the contact rod 31.

In FIG. 7, the contact roller 14 has a contact roll 33 with a rotation axis 33a perpendicular to the movement direction m and the contact force direction c. A contact-roll slider 34, e.g. an electrically conductive brush, provides electric contact from the contact roll 33 to the contact roller 14 relative to which the contact roll 33 rotates.

In FIGS. 6 and 7, the contact rod 31 and the contact-roll slider 43 are electrically connected to the spark gap 4 and spark-gap-bridging resistance 6 (FIGS. 1 to 5), respectively, by a flexible wire 35.

The contact member 12a (i.e. the contact slider 13 (FIG. 6) or the contact roller 14 (FIG. 7)) includes a lever 36. The lever 36 is pivotally mounted on a base support 37 with interposition of a member 38, here a spring cylinder, which is fixed to the base support 37. That is to say, the lever 36 is mounted on a lever pivot 39, and can swivel around a swivel axis defined by it. The lever 36 is elastically biased towards the complementary contact member 12b (the ring 15 or belt 16). Another pivot 40 (contact slider pivot 40' in FIG. 6; roll-axis pivot 40" in FIG. 7) is provided to enable the contact slider 13 or the contact-roll axis 33a to maintain an orientation parallel to the complementary contact member 12b (the ring 15 or belt 16) when the lever 36 is swiveled. In the embodiment of FIG. 6 parallelism is automatically maintained by the elastic pressure of the contact slide towards the ring 15 or belt 16. In the embodiment of FIG. 7 parallelism is forced by parallel linkage 41. These mechanisms compensate for variations in the distance between the base support 37 and the complementary contact member 12b (the ring 15 or belt 16) that may occur upon relative rotation, so that mechanical/electrical contact between the slide piece 30, or the contact roll 33, and the ring 15 or belt 16 is sustained.

In both the embodiments of FIGS. 6 and 7, the contact member 12a is, for example, elastically biased towards its complementary contact member 12b by means of a compressed, e.g. helical, spring 42 accommodated in the spring cylinder 38. The spring 42 presses at the one end against the base support 37 and, at the other end, through a spring piston 38a against a crank 43 on the lever 36, thereby producing torque pushing the lever 36, and thus the contact member 12a (contact slider 13 or roller 14) towards the complementary contact member 12b.

The direction of the force f produced by the spring 42 is perpendicular to the movement direction m and the contact force direction c. Thus, the lever mechanism of FIGS. 6 and 7 diverts the spring force direction s by approximately 90° into the contact force direction c.

The base support 37 is made of insulating material, e.g. insulating plastic, in order to isolate the contact member 12a e.g. from the rotor hub 18 on which it is mounted. In some embodiments, the member/spring cylinder 38 and/or the lever 36, and the linkage 41 (if applicable) are also made of insulating material, e.g. insulating plastic.

FIGS. 8 and 9 (Embodiments of Lightning Current Transfer Units):

FIGS. 8 and 9 are perspective views of different embodiments of a lightning current transfer unit 3 of the type illustrated in FIGS. 2 and 5, i.e. of a lightning current transfer unit enabling lightning current to be transferred between two parts 8, 9 rotatable relative to each other around two different axes 10', 10". The two parts 8, 9 are, e.g., the rotor blade 17 and the nacelle 19 (FIGS. 2, 5). As described in connection with FIG. 5, the lightning current transfer unit 3 is, for example, designed to be mounted on the rotor hub 18 of the wind turbine 1.

The embodiments of FIGS. 8 and 9 are composed of two contact members 12a', 12a", here of the contact-slider 13 type. The two contact members 12a', 12a" are arranged back-to-back, with their slide pieces 30', 30" lying approximately in parallel planes, when mounted on the wind turbine.

The two contact members 12a', 12a" are electrically connected by the flexible-wire connection 35, which runs directly from one contact member 12a' to the other 12a', thereby remaining essentially at the contact members' height above the base support 37. A spark-gap assembly 44 which implements the parallel connection of the spark gap 4 and the spark-gap-bridging resistance 6 (FIGS. 1 to 5) is interposed in the flexible-wire connection 35, e.g. in the centre between the two contact members 12a', 12a".

The spark gap 4 is mounted on a stand 45 made of insulating material, e.g. non-conductive plastic. The stand 45 is fixed to the base support 37.

The embodiment of FIG. 8 is composed of two contact members 12a', 12a" equipped with the pivot and force-diverting mechanism shown and described in connection with FIG. 6. The base support 37 is an integral part made of insulating material, e.g. non-conductive plastic. It provides a platform 46 on side walls 47, the platform 46 being elevated above the basis to which the base support 37 is to be mounted by means of bolts 48. The base support 37 is a hollow body, defined by the platform 46 and the side walls 47. In the exemplary embodiment of FIG. 8, the platform 46 is triangle-shaped. The base support 37 is a hollow body, defined by the platform 46 and the side walls 47. The platform has mountings for one or both spring cylinders 38 and the stand 45. The spring cylinder mountings are brackets 49 with a semi-cylindrical shape. The spring cylinders 38 are, for example, tied to the brackets 49 by means of plastic bands 50.

The exemplary embodiment shown in FIG. 8 refers to a particular case in which the two contact members 12', 12" are positioned at different levels above the basis of the base support 37. Thus, only one of the brackets 49 is mounted on the elevated platform 46, while the other is located at a lower level, along the side walls 47 at one of the edges of the triangle. However, in other embodiments in which the two contact members 12', 12" are at the same height, both brackets 49 are on the elevated platform 46.

The embodiment of FIG. 9 is composed of two contact members 12a', 12a" biased by pre-bent elastically deformable strips 51 made of insulating material, e.g. fibre-reinforced plastic. The stand 45 supporting the spark gap 4 (with the spark-gap-bridging resistance is, e.g. also in the form of a strip made of insulating material. The base support 37 is a sheet metal (i.e. it is not insulating) to be mounted directly on the basis. It provides mountings 52 for the elastic strips 51 and the stand 45.

Figure 10A:
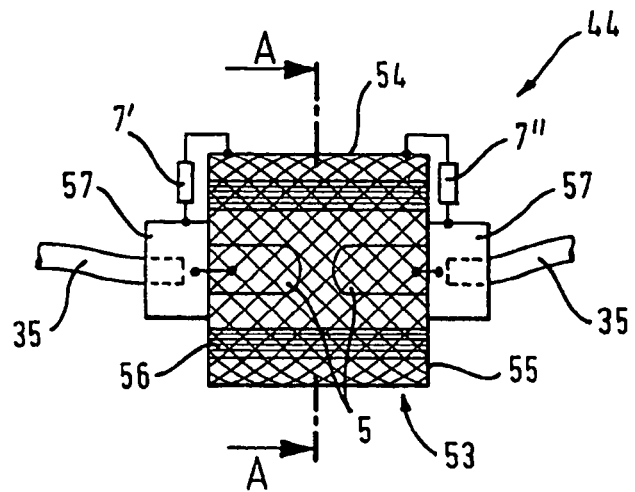
FIGS. 10a and b are a side view and a cross-section along line A-A of FIG. 10a, respectively, of an embodiment of a spark gap assembly with a mesh-type encapsulation of the spark gap.
Figure 10B:
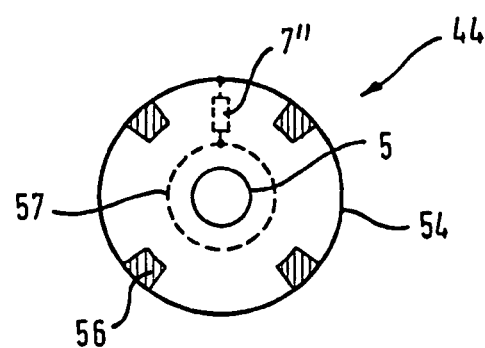
Figure 11A:
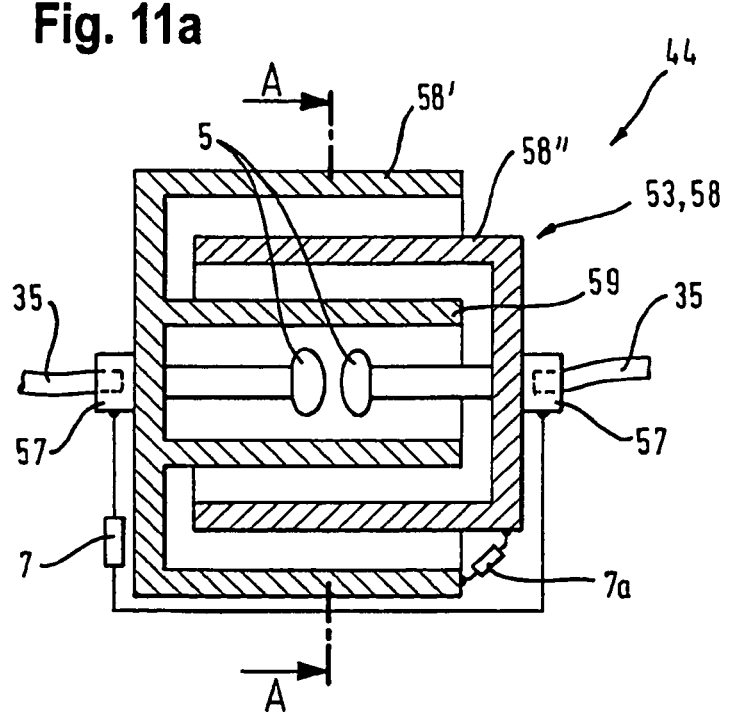
FIGS. 11a and b are a side view and a cross-section along line A-A of FIG. 11a, respectively, of another embodiment of a spark gap assembly with a labyrinth-type encapsulation of the spark gap.
Figure 11B:
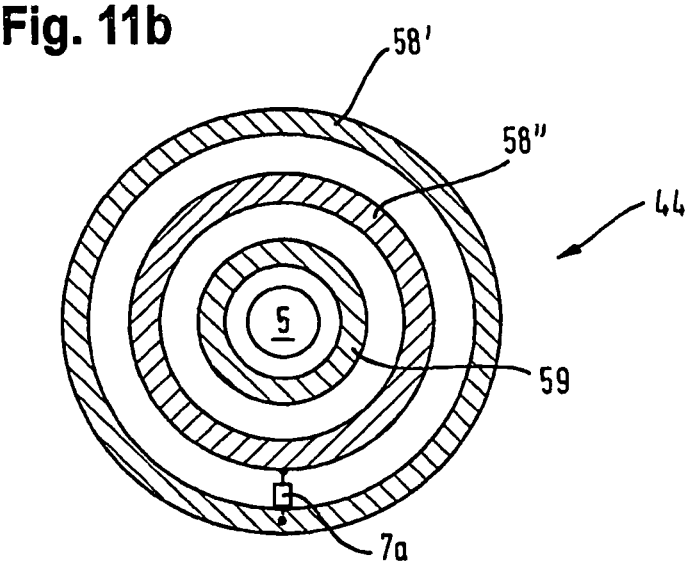

FIGS. 10 and 11 (Embodiments of Encapsulated Spark-Gap Assemblies):

The FIGS. 10 and 11 illustrate two different embodiments of spark-gap assemblies 44 (e.g. of FIGS. 8 and 9) with an encapsulation 53 of the spark gap 4. The FIGS. 10b and 11b are cross-sections along the line A-A of the side views of FIGS. 10a and 11a, respectively. The encapsulation 53 allows air to escape, but prevents particles which can be produced when a spark occurs from escaping.

In the embodiment of FIG. 10 the encapsulation 53 is formed by a cylindrical mesh 54 surrounding the spark gap 4. The front sides of the cylinder formed by the mesh 54 are closed by caps 55 made of insulating material, e.g. plastic. The cylinder is mechanically supported by rods 56 linking the caps 55. The aperture of the mesh 54 is e.g. 0.5 mm, preventing particles bigger than e.g. 0.5 from escaping from the interior of the encapsulation 53 (in FIG. 10 the mesh aperture is drawn out of scale).

The spark-gap electrodes 5 forming the spark gap 4 are placed, face-to-face, within the encapsulation 53. The tips of the rounded spark-gap electrodes 5 and spaced a certain distance (e.g. 5 mm) from each other, and are rounded to ensure that the field strength is not unduly increased and that the spark-firing voltage is well defined by the spark-electrode distance. The spark-gap electrodes 5 are inserted in electrically conductive sockets 57 and traverse the caps 55. They are connected to the wires 35 leading to the contact members 12a', 12a" (e.g. of FIGS. 8 and 9) via the sockets 57. The mesh 54 is made of electrically conductive material, e.g. metal. Each isolating cap 55 is bridged by a resistor 7', 7" connecting the corresponding socket 57 with the mesh 54. The mesh 54 forms part of the permanent-discharge current path ii bridging the spark gap 4 and including the spark-gap-bridging resistance 6. Thus, in the embodiment of FIG. 10 the spark-gap-bridging resistance 6 is composed of a series connection of the two resistors 7', 7" and the electrically conductive mesh 54 interposed between them.

In the embodiment of FIG. 11 the encapsulation 53 is formed by a cylindrical labyrinth 58 surrounding the spark gap 4. The labyrinth 58 is formed by complementary cup-shaped labyrinth halves 58', 58" inserted into each other. In FIG. 11, one of the labyrinth halves 58' has an additional inner cylinder 59 so that gas escaping from the centre (the position of the spark gap 4) is turned round twice by 180° before leaving the labyrinth 58.

The spark-gap electrodes 5 forming the spark gap 4 are placed, face-to-face, in the centre of the inner cylinder 59. As in FIG. 10, the spark-gap electrodes 5 are spaced a certain distance (e.g. 5 mm) and are rounded. The spark-gap electrodes 5 are inserted in electrically conductive sockets 57 and traverse the bottoms of the cup-shaped labyrinth halves 58', 58". They are connected to the wires 35 leading to the contact members 12a', 12a" (e.g. of FIGS. 8 and 9) via the sockets 57.

The labyrinth 58 may be made of non-conductive material. It is bridged by a resistor 7 connecting the two sockets 57. In other embodiments, the labyrinth is made of electrically conductive material, and the resistor 7a bridges only the gap between the labyrinth halves 58', 58" (drawn with hatched lines in FIG. 11). In the latter embodiment, the labyrinth 58 forms part of the permanent-discharge current path ii.

All publications mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A lightning current transfer assembly for a wind turbine comprising at least a first part and a second part rotatable relative to each other, the lightning current transfer assembly being arranged to transfer lightning current from the first part to the second part, comprising:
   at least one electric contact arrangement comprising complementary contact members which provide electric connection by mechanically contacting each other while being movable relative to each other;
   a spark gap connected in series with the at least one electric contact arrangement, wherein the spark gap comprises spark-gap electrodes, the spark-gap electrodes being stationary relative to each other; and
   a spark-gap-bridging resistance connected parallel to the spark gap,
   the lightning current transfer assembly thereby providing at least two alternative current paths from the first part to the second part:
   (i) a lightning current path across the at least one electric contact arrangement and the spark gap, and
   (ii) a permanent-discharge current path across the at least one electric contact arrangement and through the spark-gap-bridging resistance.

2. The lightning current transfer assembly of claim 1, wherein the spark-gap-bridging resistance comprises one or more resistors.

3. The lightning current transfer assembly of claim 1, wherein the complementary contact members of the at least one electric contact arrangement comprise a contact slider or roller and a complementary ring or belt contacted by the contact slider or roller.

4. The lightning current transfer assembly of claim 1, the lightning current transfer assembly being arranged to transfer lightning current between first and second parts rotatable relative to each other around two different axes, the lightning current transfer assembly comprising at least two electric contact arrangements connected in series.

5. The lightning current transfer assembly of claim 4, wherein the spark gap and the spark-gap-bridging resistance are interposed between the at least two electric contact arrangements, thereby forming a series connection of a first electric contact arrangement, the spark gap, the parallel connection of the spark gap and the spark gap bridging resistance, and a second electric contact arrangement.

6. The lightning current transfer assembly of claim 4, wherein
   the lightning current transfer assembly is arranged for mounting on a wind turbine comprising at least one rotor blade, a rotor hub, and a nacelle, the rotor blade being rotatable relative to the rotor hub around a first axis, and the rotor hub being rotatable relative to the nacelle around a second axis,
   the lightning current transfer assembly comprising a lightning current transfer unit arranged to be mounted on the rotor hub,
   wherein the lightning current transfer assembly provides a lightning current path and a permanent-discharge current path from the rotor blade to the nacelle by means of the at least two electric contact arrangements, connected in series with the parallel connection of the spark gap and the spark-gap-bridging resistance interposed.

7. The lightning current transfer assembly of claim 6, wherein both the galvanically discontinuous lightning current path and the permanent-discharge current path through the lightning current transfer unit are electrically isolated from the rotor hub, so that lightning current bypasses the rotor hub and rotation-enabling bearings between the rotor blade and the rotor hub and between the rotor hub and the nacelle.

8. The lightning current transfer assembly of claim 4, wherein the at least two electric contact arrangements are connected by a wire, the spark gap being interposed in the wire connection between the at least two electric contact arrangements.

9. The lightning current transfer assembly of claim 1, wherein the spark gap is mounted on an isolating stand.

10. The lightning current transfer assembly of claim 1, comprising a base support made of insulating material which is a common support of both the spark gap and at least one of the contact members.

11. The lightning current transfer assembly of claim 10, wherein the at least one of the contact members is pivotally mounted on the base support or to a member fixed to the base support.

12. The lightning current transfer assembly of claim 1, wherein the spark gap is encapsulated, the encapsulation allowing air to escape, but preventing particles produced when a spark occurs from escaping.

13. The lightning current transfer assembly of claim 12, wherein the spark gap encapsulation comprises a mesh surrounding the spark gap.

14. The lightning current transfer assembly of claim 12, wherein the spark gap encapsulation comprises a labyrinth-shaped housing.

15. The lightning current transfer assembly of claim 12, wherein the spark gap encapsulation is at least partially made of electrically conductive material and forms part of the permanent-discharge current path bridging the spark gap and including the spark-gap-bridging resistance.

16. A wind turbine, comprising:
   at least one lightning current transfer assembly comprising at least a first part and a second part rotatable relative to each other, the lightning current transfer assembly being arranged to transfer lightning current from the first part to the second part, comprising:
   at least one electric contact arrangement comprising complementary contact members which provide electric connection by mechanically contacting each other while being movable relative to each other;
   a spark gap connected in series with the at least one electric contact arrangement, wherein the spark gap comprises spark-gap electrodes, the spark-gap electrodes being stationary relative to each other; and
   a spark-gap-bridging resistance connected parallel to the spark gap,
   the lightning current transfer assembly thereby providing at least two alternative current paths from the first part to the second part:
   (i) a lightning current path across the at least one electric contact arrangement and the spark gap, and
   (ii) a permanent-discharge current path across the at least one electric contact arrangement and through the spark-gap-bridging resistance.

* * * * *